United States Patent
Ikeda

(10) Patent No.: US 6,688,750 B2
(45) Date of Patent: Feb. 10, 2004

(54) OPTICAL MEMBER

(75) Inventor: Hideo Ikeda, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 0 days.

(21) Appl. No.: 10/055,089

(22) Filed: Jan. 22, 2002

(65) Prior Publication Data

US 2003/0137758 A1 Jul. 24, 2003

(51) Int. Cl.[7] ................................................ G02B 5/08
(52) U.S. Cl. ........................................ 359/883; 349/112
(58) Field of Search ........................... 359/883, 496, 359/599, 831, 834; 349/112, 100

(56) References Cited

U.S. PATENT DOCUMENTS

| | | | | |
|---|---|---|---|---|
| 4,417,784 A | * | 11/1983 | Knop et al. | 359/568 |
| 6,147,732 A | * | 11/2000 | Aoyama et al. | 349/112 |
| 6,243,199 B1 | * | 6/2001 | Hansen et al. | 359/486 |
| 6,310,733 B1 | * | 10/2001 | Dolgoff | 359/743 |

FOREIGN PATENT DOCUMENTS

| | | |
|---|---|---|
| JP | 61-136746 | 6/1986 |
| JP | P2001-33623a | 2/2001 |

* cited by examiner

*Primary Examiner*—Euncha Cherry
(74) *Attorney, Agent, or Firm*—Westerman, Hattori, Daniels & Adrian LLP

(57) ABSTRACT

In an optical member, comprising a laminated body in which adhesive layers are prepared in an optical material, wherein a side face of the laminated body has a concavo-convex repeated structure by waveform, rectangle, trapezoid, or zigzagged form, the adhesive layer exposed in a side face may not be easily drawn out by a contact to conveyance instruments or by a friction caused when the optical members are taken out from a piled state etc., and also conveyance interference in assembly line, break of adhesive in adhesive layer side face, a pollution with adhesives, a display interference may not be easily generated.

40 Claims, 1 Drawing Sheet

FIG.1
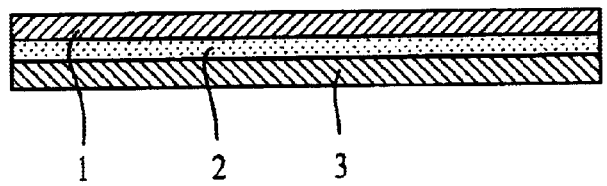
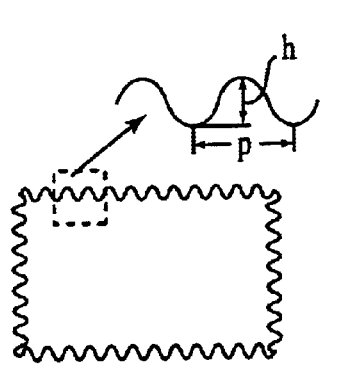
FIG.2(a)
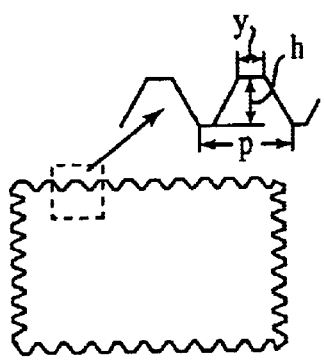
FIG.2(b)
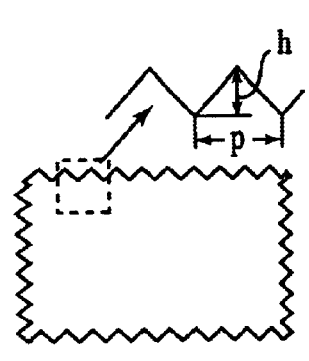
FIG.2(c)

OPTICAL MEMBER

BACKGROUND OF THE INVENTION

1. Field of the Invention

The present invention relates to an optical member in which generation of break of adhesives, surface pollution, etc. in a side face of an adhesive layer prepared in an optical material is prevented.

2. Description of the Background Art

Optical materials used for manufacturing of a liquid crystal display (LCD) etc., such as a polarizing plate and a retardation plate are practically used in a form of optical members comprising a laminated body in which adhesive layers are prepared in optical materials beforehand, for example; elliptically polarizing plates to which a polarizing plate and a retardation plate are laminated through adhesive layers beforehand; and optical members in which adhesive layers for being adhered with other members such as liquid crystal cell etc. are attached beforehand to a polarizing plate, in order to prevent variation in quality and to increase in efficiency of LCD assembly etc.

The above-mentioned laminated body is usually manufactured as a long size, and continually is cut by straight line and formed into an optical member with a predetermined size. In the case, minute cracks, smudges of adhesive layer, etc. occur in cut parts of the laminated bodies. Therefore, some measures are adopted in which after a smoothing processing for cut face is adopted by cutting etc. and then the laminated body is presented into a practical use (JP, 61-136746,A).

However, in a case the optical member by treated with the above-mentioned smoothing processing is presented for an assembly line of LCD etc., an adhesive layer exposed on a processing face is drawn out in a shape of strand by a contact of the processing face with conveyance instruments or by a friction of piled-up optical members being taken out, etc., to cause pollution with adhesives on a side face of the optical member. Since optical members are pulled with each other by adhesion of the pollution with adhesives, there occurred a problem that conveyance became impossible. Moreover, when the optical members are adhered to a display, the adhesive layer drawn out is entangled into the optical members to cause an defect in assembly, and sometimes break of adhesive in the adhesive layer occurred by the above-mentioned drawn-out of adhesives, and then there occurred a problem that induces a display interference as abnormal appearance etc.

The object of the present invention is to provide an optical member in which an adhesive layer exposed in a side face may not be easily drawn out by a contact to conveyance instruments or by a friction caused when the optical members are taken out from a piled state etc., and also conveyance interference in assembly line, break of adhesive in adhesive layer side face, a pollution with adhesives, a display interference may not be easily generated.

SUMMARY OF THE INVENTION

The present invention provides an optical member comprising a laminated body in which adhesive layer is prepared in an optical material, wherein a side face of the laminated body has a concavo-convex repeated structure by waveform, rectangle, trapezoid, or zigzagged form.

The present invention in the above-mentioned optical member, the concavo-convex repeated structure has a pitch from 0.2 to 20 mm, and a projected length of convex position from 0.1 to 10 mm.

The optical member in the above-mentioned optical member, the side face having the concavo-convex repeated structure occupies all surrounding of the laminated body or a part thereof.

The optical member in the above-mentioned optical member, the optical material comprises at least one of a polarizing plate, a retardation plate and a brightness enhanced plate.

In the present invention, since a side face has a concavo-convex repeated structure, it is prevented that an adhesive layer is drawn out by a contact to conveyance instruments, or by a friction caused at time of the optical member being taken out from piled state, and as a result an optical member can be obtained in which problems such as conveyance interference in assembly line, break of adhesive or pollution with adhesives in a side face of an adhesive layer etc. or display inhibition hardly occur. Moreover, since a side face having a concavo-convex repeated structure may be formed by cutting processing as punch processing etc., a method of the present invention excels also in manufacturing efficiency.

BRIEF DESCRIPTION OF THE DRAWINGS

FIG. 1 is a sectional view of Example.

FIG. 2(*a*) is a diagram of concavo-convex repeated structure having a waveform in side face.

FIG. 2(*b*) is a diagram of concavo-convex repeated structure having a trapezoid in side face.

FIG. 2(*c*) is a diagram of concavo-convex repeated structure having a zigzagged form in side face.

DESCRIPTION OF THE PREFERRED EMBODIMENTS

An optical member of the present invention comprises a laminated body with adhesive layers prepared in an optical material, and a side face of the laminated body is formed in a concavo-convex repeated structure by waveform, rectangle, trapezoid, or zigzagged form. An example is shown in FIG. 1. Reference number 1 shows an optical material, 2 shows an adhesive layer, and 3 shows a separator.

The optical material may be a suitable one used for the formation of a liquid crystal display, such as a polarizing plate, a retardation plate, an elliptically polarizing plate obtained by lamination of these, or a brightness enhanced plate, and the kind of the optical material is not particularly limited. Two or three or more optical materials may form the laminated bodies.

The polarizing plate may be a reflecting type, a semi-transparent type, or the like. Further, the retardation plate may be a half wavelength plate, a quarter wavelength plate, one having a suitable object such as viewing angle compensation, or the like. In the case of an optical material of a laminate type such as the aforesaid elliptically polarizing plate, the lamination thereof may have been carried out via a suitable bonding means such as an adhesive layer.

Examples of the aforesaid polarizing plate include a polarizing film obtained by allowing a dichroic substance such as iodine or a dye to be adsorbed onto a hydrophilic polymer film such as a polyvinyl alcohol series film, partially formalized polyvinyl alcohol series film, ethylene/vinyl acetate copolymer series partially saponified film, or cellulose series film and stretching the film; or a polyene oriented film such as a dehydrated product of polyvinyl alcohol or a dehydrochlorinated product of polyvinyl chloride. The polarizing plate may have a transeparent protective layer onto one or both surface of the polarizing film.

On the other hand, the reflecting type polarizing plate is for forming a liquid crystal display or the like of a type such that the incident light from the viewing side (display side) is reflected for display. This has an advantage in that the incorporation of a light source such as a backlight can be omitted to facilitate fabrication of a liquid crystal display having a reduced thickness. The reflecting type polarizing plate may be formed by a suitable method such as a method of attaching a reflecting layer made of metal or the like onto one surface of a polarizing film, optionally via a transparent protective layer or the like.

A specific example of the reflecting type polarizing plate may be one in which a foil or a vapor-deposited film made of a reflecting metal such as aluminum is attached onto one surface of a transparent protective layer made of an optionally matted film or the like. The reflecting type polarizing plate may be one having a reflecting layer of a fine undulating structure on the aforesaid diffusing type transparent protective layer. Further, the reflecting layer is preferably used in a state in which the reflecting surface thereof is covered with a transparent protective film, a polarizing plate, or the like, in view of preventing decrease in the reflectivity caused by oxidation, hence long-term duration of initial reflectivity, avoidance of separately attaching a protective layer, and other reasons.

The aforesaid reflecting layer having a fine undulating structure has advantages such as preventing directivity or glittering appearance by diffusing the incident light by random reflection, thereby restraining the unevenness of brightness. Also, the transparent protective layer containing fine particles has such an advantage that the incident light and the reflected light thereof are diffused while passing therethrough, whereby the unevenness of brightness and darkness can be further restrained.

The reflecting layer of a fine undulating structure reflecting the surface fine undulating structure of the transparent protective layer can be formed, for example, by attaching metal directly onto the surface of a transparent protective layer with the use of a suitable method of vapor deposition type such as the vacuum vapor deposition method, the ion plating method, or the sputtering method or plating type or the like.

The aforesaid conventional transparent protective layer may be made of plastics, excellent in transparency, mechanical strength, thermal stability, moisture shielding property, isotropic property, and others. The plastics include, for example, a cellulose series resin such as cellulose triacetate, polyester, polycarbonate, polyamide, polyimide, polyethersulfone, polysulfone, polystyrene, or acrylic resin, polyolefin, or thermosetting or ultraviolet-curing resin such as acryl series, urethane series, acrylurethane series, epoxy series, or silicone series, or the like.

The transparent protective layer may be formed by a suitable method such as a method of coating a polymer or a method of laminating those made into films, and the thickness thereof may be suitably determined. The thickness is typically at most 500 $\mu$m, preferably from 1 to 300 $\mu$m, more preferably from 5 to 200 $\mu$m. The fine particles to be contained in the aforesaid transparent protective film may be, for example, suitable transparent particles such as inorganic fine particles made of silica, alumina, titania, zirconia, tin oxide, indium oxide, cadmium oxide, antimony oxide, or the like having an average particle size of from 0.5 to 50 $\mu$m, which may be electrically conductive, or organic fine particles made of a cross-linked or non-cross-linked polymer or the like.

Meanwhile, specific examples of the aforesaid retardation plate include birefringent films obtained by stretching a film made of a suitable polymer such as polycarbonate, polyvinyl alcohol, polystyrene, polymethyl methacrylate, polyolefin such as polypropylene, polyallylate, or polyamide, oriented film of liquid crystal polymer, and those in which an oriented layer of liquid crystal polymer is supported with a film.

The retardation plate may be, for example, one having a suitable retardation according to the intended usage such as compensation of various wavelength plates, coloring by birefringence of liquid crystal layer, or viewing angle, or may be a tilted orientation film with controlled refractive index in the thickness direction. Further, two or more kinds of retardation plates may be laminated to control the optical characteristics such as retardation.

The aforesaid tilted orientation film can be obtained, for example, by a method of bonding a heat-shrinking film onto a polymer film and subjecting the polymer film to a stretching process and/or a shrinking process under the action of its shrinking force by heating, a method of obliquely orienting a liquid crystal polymer, or the like method.

The optical material may be made of a laminate of two more optical layers such as a laminate of the aforesaid elliptically polarizing plate, reflecting type polarizing plate, or retardation plate. Therefore, the optical material may be a combination of polarizing plate with retardation plate and/or brightness enhanced plate, a combination of a reflecting type polarizing plate or semitransparent type polarizing plate with a retardation plate, or the like.

An optical material obtained by lamination of two or more optical layers may be formed by a method of successive and separate lamination in a process of producing a liquid crystal display or the like; however, an optical material having optical layers laminated in advance is excellent in the stability of quality and in the operability of assemblage, thereby providing an advantage of improving the efficiency in producing a liquid crystal display.

The brightness enhanced plate is sometimes referred to as polarizing separating plate, and shows such a property that, when natural light is incident, a linearly polarized light of a predetermined polarizing axis or a circular polarized light in a predetermined direction is reflected, and the other light is transmitted. The brightness enhanced plate is used for the purpose of improving brightness in a liquid crystal display.

Namely, the brightness enhanced plate is used for the purpose of improving brightness by using a method such as allowing light from a light source such as a backlight to be incident into the brightness enhanced plate so as to obtain a transmitted light in a predetermined polarized state, and allowing the reflected light to be reversed via a reflecting layer or the like to be incident into the brightness enhanced plate again, and allowing all or part thereof to be transmitted as a light in a predetermined polarized state so as to increase the amount of light transmitted through the brightness enhanced plate as well as supplying a polarized light that is hardly absorbed by a polarizing plate so as to increase the amount of light that can be used for liquid crystal display or the like.

Therefore, as the brightness enhanced plate can be used a suitable plate, for example, that shows a property of transmitting a linearly polarized light of a predetermined polarizing axis and reflecting the other light, such as a multi-layer thin film of dielectrics or a multi-layer laminate of thin films having different refractive index anisotropies (D-BEF and others manufactured by 3M Co., Ltd.), or that shows a property of reflecting one of right and left circular polarized lights and transmitting the other light, such as a cholesteric liquid crystal layer, particularly an oriented film of cholesteric liquid crystal polymer or one in which the oriented liquid crystal layer is supported on a film base material (PCF350 manufactured by NITTO DENKO CORPORATION, Transmax manufactured by Merck Co., Ltd., and others).

In the aforesaid brightness enhanced plate of a type that transmits a linearly polarized light of a predetermined polarizing axis, the light can be efficiently transmitted while restraining the absorption loss by the polarizing plate, by allowing the transmitted light to be incident, as it is, into the polarizing plate with aligned polarized axis.

On the other hand, in the brightness enhanced plate of a type that transmits a circular polarized light, such as a cholesteric liquid crystal layer, it is preferable to allow the light to be incident into the polarizing plate after converting the transmitted circular polarized light into a linearly polarized light via a retardation plate instead of allowing the light to be incident, as it is, into the polarizing plate to restrain the absorption loss. The circular polarized light can be converted into a linearly polarized light by using a quarter wavelength plate as the retardation plate and disposing the plate between the polarizing plate and the brightness enhanced plate.

A retardation plate that functions as a quarter wavelength plate in a wide wavelength range such as a visible light region can be obtained by a method such as superposing a retardation layer that functions as a quarter wavelength plate to a monochroic light such as a 550 nm wavelength light, onto a retardation layer that shows a different retardation characteristics, for example, a retardation layer that functions as a half wavelength plate. Therefore, the retardation plate to be disposed between the polarizing plate and the brightness enhanced plate may be made of one or more layers of retardation layers.

Also, as to the cholesteric liquid crystal layer, one can obtain a layer that reflects a circular polarized light in a wide wavelength range such as a visible light region by providing a configuration structure in which two or more layers are superposed using a combination of layers having different reflection wavelengths.

In order to adhere the optical material to other member, such as liquid crystal cell or to each other, the adhesive layer is disposed onto one or both surface the optical material. The adhesive substance or adhesive agent forming the adhesive layer is no particular limited, can used a suitable one. An example thereof is an adhesive containing a suitable polymer such as an acryl series polymer, a silicone series polymer, polyester, polyurethane, polyamide, polyether, fluorine series polymer, or rubber series polymer, as a base polymer.

In particular, for forming an adhesive layer to be left on the optical material, it is preferable to use an adhesive being excellent in optical transparency, exhibiting adhesive characteristics of suitable wettability, cohesiveness, and adhesiveness, and being excellent in weather resistance, heat resistance, and the like, such as an acryl series adhesive. And the adhesive layer to be left on the optical material is preferably formed of an adhesive having a low moisture absorption and being excellent in heat resistance, in view of preventing a foaming phenomenon or a peeling phenomenon caused by moisture absorption, preventing decrease in the optical characteristics or warpage of the liquid crystal cell caused by thermal expansion difference or the like, hence the formability of a liquid crystal display having a high quality and being excellent in durability.

The adhesive layers may comprise, suitable additives such as natural and synthetic resins; glass fibers, glass beads, fillers such as metal powders, other inorganic powders, and pigments, and the like, coloring agents, and antioxidants, which can be blended in accordance with the needs. Further, an adhesive layer exhibiting an optical diffusion property can be made by allowing fine particles to be contained therein.

The adhesive layer can be attached onto one side or both sides of the optical material by a suitable method. Examples of the method include a method of preparing an adhesive solution of from 10 to 40 wt % by dissolving or dispersing an adhesive substance or a composition thereof into a solvent made of a single one or a mixture of suitable solvents such as toluene and ethyl acetate, and attaching the adhesive solution directly onto the optical material by a suitable developing method such as the casting method or the application method, and a method of forming an adhesive layer on a separator in accordance with the above and transferring the adhesive layer onto the optical material.

The adhesive layer can also be provided on the optical member as superposed layers of those of different compositions, those of different kinds, or the like. The different composition or kind, or thickness of the adhesive layers may be formed, when the adhesive layers to be disposed on both side of the optical member. The thickness of the adhesive layer can be suitably determined in accordance with the intended usage or the adhesive strength, and is typically from 1 to 500 $\mu$m, preferably from 5 to 200 $\mu$m, more preferably from 10 to 100 $\mu$m.

The optical material or the adhesive layer constituting the optical member may be allowed to have an ultraviolet absorbing capability by a method of treating with a ultraviolet absorber such as a salicylic acid ester series compound, a benzophenol series compound, a benzotriazol series compound, a cyanoacrylate series compound, or a nickel complex salt series compound.

A laminated body as a subject to be treated of the present invention has at least one layer of the optical material and at least one layer of the adhesive layer. Therefore, the laminated body may be a laminated body having two or more layers of the optical material and/or two or more layers of the adhesive layers. In addition, when the adhesive layer of the laminated body is exposed outside, it is preferable as is shown in Figure to adhere a separator 3 etc. temporarily and to protect the adhesive layer from contamination etc. The separator can be formed, for example, by a method of providing a release coating layer made of a suitable release agent such as silicone series, long-chain alkyl series, fluorine series, or molybdenum sulfide on a suitable thin foliate in accordance with the needs, or the like method. Moreover, when the optical material is exposed outside, the optical material may also be a laminated body with a protective film adhered on a face.

The optical member of the present invention may be manufactured by a method in which the laminated body in long size with at least the optical material and the adhesive layer is formed into an optical member with a predetermined size in a cutting method or punching method using a cutting edge having a predetermined concavo-convex repeated structure. In this case, a cut face is not usually necessary to be smoothed by cutting etc., smoothing processing may be given, if needed, when minute cracks and smudges of adhesive layer, etc. are observed. Moreover, the above-mentioned cutting and punch processing may also be given to a piled body of two or more laminated bodies.

Side faces of the above-mentioned laminated body formed by cutting processing etc. are making into a concavo-convex repeated structure having a waveform, a rectangle, a trapezoid, or a zigzagged form. Examples of form of the side face are shown in FIG. 2(a), FIG. 2(b), and FIG. 2(c). Generation of forming loss (cutting loss) may be prevented by giving a side face a concavo-convex repeated structure having a waveform as in FIG. 2(a), a trapezoid or a rectangle as in FIG. 2(b), and a zigzagged form (triangle) as in FIG. 2(c).

A dimension of concavo-convex form in the above-mentioned repeated structure having waveform, rectangle, trapezoid, or zigzagged form may be suitably given according to a size of an optical member etc. In order to prevent drawn-out of the adhesive layer exposed on side face, the repeated structure may have pitch p from 0.2 to 20 mm, preferably from 1 to 15 mm, and more preferably from 2 to 10 mm, and may have a projected length of convex position h from 0.1 to 10 mm, preferably from 0.2 to 8 mm, and more preferably from 0.3 to 5 mm.

In addition, in concavo-convex repeated structure with a trapezoid as in FIG. 2(b), a length of an upper side y is no less than 0.1 mm, preferably no less than 0.2 mm, and more preferably no less than 0.3 mm in order to prevent drawn-out of an adhesive layer exposed on the side face, and the side face may have a rectangle concavo-convex repeated structure by setting the length an upper side into half of pitch (p/2).

Side face that has a concavo-convex repeated structure having above-mentioned waveform, rectangle, trapezoid, and zigzagged form may occupy all surrounding of the optical member (laminated body), and may occupy a part. When occupying a part, it is preferable that all length of at least one side face, especially two sides, such as subtense, may have the concavo-convex repeated structure concerned. The concavo-convex repeated structure concerned, two or more kinds of waveform, rectangle, trapezoid, or zigzagged form may be combined together.

In the optical member of the present invention, side faces having the concavo-convex repeated structure prevent a drawn-out phenomenon of adhesive layer and a pollution with adhesives and therefore in case of conveyance on lines, such as manufacturing and processing, conveyance interference is prevented that is caused by an adhesion of side faces of the optical member to guide faces of lines etc. The optical member may preferably be used in assembly manufacturing of various equipments, such as liquid crystal displays, etc. An optical member of the present invention may be preferably used for optical members for precision uses in which contamination in edge portion etc. is inappropriate and for equipments manufactured using optical members in uses in which materials are conveyed on line.

EXAMPLE

Example 1

A triacetylcellulose film with a thickness of 80 μm was adhered on both sides of polyvinyl alcohol derived polarizing film in a long size that has a thickness of 70 μm and a width of 55 cm, through a polyvinyl alcohol derived adhesive layer with a thickness of 20 μm to obtain a polarizing plate, on which simultaneously an acrylics derived adhesive layer with a thickness of 20 μm prepared on a separator was adhered on one side together with the separator to obtain a laminated body. Punching processing giving 13-inch size was performed to the laminated body using a cutting edge that has a repeated concavo-convex structure with a waveform, and optical members of 10000 sheets were obtained. In addition, a pitch p of a concavo-convex with a waveform was set to 3 mm, and projection length h of convex position was set to 0.5 mm.

Example 2

Except that punching processing is performed using a cutting edge that has a trapezoid concavo-convex repeated structure with a pitch p of 5 mm, a projection length h of convex position of 1 mm, and upper side of 0.5 mm, an optical member was obtained by the same method as Example 1.

Example 3

Except that punching processing is performed using a cutting edge that has a zigzagged form concavo-convex repeated structure with a pitch p of 8 mm, a projection length h of convex position of 4 mm, an optical member was obtained by the same method as Example 1.

Comparative Example

Except that punching processing is performed using a straight line type cutting edge, an optical member was obtained by the same method as Example 1.

Evaluation Examination

Existence of tacky feeling of adhesion, break of adhesives, and pollution with adhesives in side faces was investigated for the optical members obtained in Examples and Comparative examples, and the result is shown in next table.

|  | Tacky feeling of adhesion | Break of adhesives | Pollution with adhesives |
| --- | --- | --- | --- |
| Example 1 | None | None | None |
| Example 2 | None | None | None |
| Example 3 | None | None | None |
| Comparative example | Observed | Observed | Observed |

What is claimed is:

1. An optical member comprising a laminated body including an adhesive layer prepared in an optical material, said laminated body comprising two opposed main faces and a side face along an edge of the main faces, wherein the side face of the laminated body has a concavo-convex repeated structure.

2. The optical member according to claim 1, wherein the concavo-convex repeated structure has a pitch from 0.2 to 20 mm.

3. The optical member according to claim 1, wherein the side face having the concavo-convex repeated structure occupies all surrounding of the laminated body.

4. The optical member according to claim 1, wherein the optical material comprises a polarizing plate.

5. The optical member according to claim 1, wherein the concavo-convex repeated structure is formed using a cutting edge having a predetermined concavo-convex repeated structure.

6. The optical member according to claim 1, wherein the concavo-convex repeated structure has a pitch from 1 to 15 mm, and a projected length of convex position from 0.2 to 8 mm.

7. The optical member according to claim 1, wherein the concavo-convex repeated structure has a pitch from 2 to 10 mm, and a projected length of convex position from 0.3 to 5 mm.

8. The optical member according to claim 1, wherein the thickness of the adhesive layer is from 5 to 200 μm.

9. The optical member according to claim 1, wherein the thickness of the adhesive layer is from 10 to 100 μm.

10. The optical member according to claim 1, wherein the laminated body comprises a separator.

11. The optical member according to claim 1, wherein the concavo-convex repeated structure is by waveform.

12. The optical member according to claim 1, wherein the concavo-convex repeated structure is by rectangle.

13. The optical member according to claim 1, wherein the concavo-convex repeated structure is by trapezoid.

14. The optical member according to claim 1, wherein the concavo-convex repeated structure is by zigzagged form.

15. The optical member according to claim 1, wherein the concavo-convex repeated structure has a projected length of convex position form 0.1 to 10 mm.

16. The optical member according to claim 2, wherein the concavo-convex repeated structure has a projected length of convex position form 0.1 to 10 mm.

17. The optical member according to claim 1, wherein the side face having the concavo-convex repeated structure occupies a part of the surrounding of the laminated body.

18. The optical member according to claim 1, wherein the optical material comprises a retardation plate.

19. The optical member according to claim 1, wherein the optical material comprises a brightness enhancement plate.

20. The optical member according to claim 1, wherein the side face having the concavo-convex repeated structure occupies two sides of the laminated body.

21. A display comprising an optical member, said optical member comprising a laminated body including an adhesive layer is prepared in an optical material, said laminated body comprising two opposed main faces and a side face along an edge of the main faces, wherein the side face of the laminated body has a concavo-convex repeated structure.

22. The display according to claim 21, wherein the concavo-convex repeated structure has a pitch from 0.2 to 20 mm.

23. The display according to claim 21, wherein the side face having the concavo-convex repeated structure occupies all surrounding of the laminated body.

24. The display according to claim 21, wherein the optical material comprises a polarizing plate.

25. The display according to claim 21, wherein the concavo-convex repeated structure is formed using a cutting edge having a predetermined concavo-convex repeated structure.

26. The display according to claim 21, wherein the concavo-convex repeated structure has a pitch from 1 to 15 mm, and a projected length of convex position from 0.2 to 8 mm.

27. The display according to claim 21, wherein the concavo-convex repeated structure has a pitch from 2 to 10 mm, and a projected length of convex position from 0.3 to 5 mm.

28. The display according to claim 21, wherein the thickness of the adhesive layer is from 5 to 200 μm.

29. The display according to claim 21, wherein the thickness of the adhesive layer is form 10 to 100 μm.

30. The display according to claim 21, wherein the laminated body comprises a separator.

31. The display according to claim 21, wherein the concavo-convex repeated structure is by waveform.

32. The display according to claim 21, wherein the concavo-convex repeated structure is by rectangle.

33. The display according to claim 21, wherein the concavo-convex repeated structure is by trapezoid.

34. The display according to claim 21, wherein the concavo-convex repeated structure is by zigzagged form.

35. The display according to claim 21, wherein the concavo-convex repeated structure has a projected length of convex position form 0.1 to 10 mm.

36. The optical member according to claim 2, wherein the concavo-convex repeated structure has a projected length of convex position form 0.1 to 10 mm.

37. The display according to claim 21, wherein the side face having the concavo-convex repeated structure occupies a part of the surrounding of the laminated body.

38. The display according to claim 21, wherein the optical material comprises a retardation plate.

39. The display according to claim 21, wherein the optical material comprises a brightness enhancement plate.

40. The display according to claim 21, wherein the side face having the concavo-convex repeated structure occupies two sides of the laminated body.

* * * * *